(12) United States Patent
Lebizay et al.

(10) Patent No.: US 7,124,202 B2
(45) Date of Patent: Oct. 17, 2006

(54) SYSTEM AND METHOD FOR AGGREGATING CHANNEL SEGMENT ID'S INTO A FIRST SECTION AND DATA SEGMENTS INTO A SECOND SECTION

(75) Inventors: Gerald Lebizay, Madison, NJ (US); David W. Gish, Riverdale, NJ (US); Henry M. Mitchel, Wayne, NJ (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 10/002,522

(22) Filed: Nov. 13, 2001

(65) Prior Publication Data

US 2003/0093550 A1   May 15, 2003

(51) Int. Cl.
*G06F 13/00* (2006.01)
(52) U.S. Cl. ...................................... 709/246
(58) Field of Classification Search ................ 370/351, 370/352, 356, 229, 230, 473; 712/204
See application file for complete search history.

(56) References Cited

U.S. PATENT DOCUMENTS

| | | | | |
|---|---|---|---|---|
| 5,930,265 A | * | 7/1999 | Duault et al. | 370/473 |
| 6,304,567 B1 | * | 10/2001 | Rosenberg | 370/356 |
| 6,865,150 B1 | * | 3/2005 | Perkins et al. | 370/230 |

FOREIGN PATENT DOCUMENTS

EP     1 063 830 A1    12/2000
EP     1 134 944 A2    9/2001

OTHER PUBLICATIONS

J. Postel, 'Transmission Control Protocol, Darpa Internet Program Protocol Specification,' RFC: 793, pp. 1-85, Sep. 1981.
R. Cherukuri, et al., 'Voice over MPLS—Bearer Transport Implementation Agreement,' MPLS Forum 1.0, MPLS Forum Technical Committee, pp. 1-41, Jul. 27, 2001.
'MT90880 Product Brief,' pp. 1-8, MITEL Corporation, 2001.
J. Rosenberg, et al., 'An RTP Payload Format for User Multiplexing,' Internet Engineering Task Force, pp. 1-10, May 6, 1998.
H. Schulzrinne, et al., 'RTP: A Transport Protocol for Real-Time Applications,' RFC: 1889, pp. 1-75, Jan. 1996.
J. Postel, 'User Datagram Protocol,' RFC: 768, pp. 1-3, Aug. 28, 1980.
J. Postel, et al., 'Internet Protocol, Darpa Internet Program Protocol Specification,' RFC: 791, pp. 1-45, Sep. 1981.

* cited by examiner

*Primary Examiner*—Robert B. Harrell
(74) *Attorney, Agent, or Firm*—Blakely, Sokoloff, Taylor & Zafman LLP (57) ABSTRACT

Multiple voice channels are aggregated into a packet having a segmented data structure and sent over a packet network. The segmented data structure includes segment IDs, corresponding data segments and a packet header arranged so that all data is aligned on 8-byte boundaries for efficient processing by 64-bit processors. The data segment represents one or more milliseconds of digitized voice data, and the segment ID explicitly identifies the voice channel associated with the digitized voice data without reference to any other data in the data structure.

17 Claims, 7 Drawing Sheets

SYSTEM AND METHOD FOR AGGREGATING CHANNEL SEGMENT ID'S INTO A FIRST SECTION AND DATA SEGMENTS INTO A SECOND SECTION

FIELD OF THE INVENTION

The present invention relates generally to Internet telephony. More particularly, the present invention relates to improving the way voice packets are sent over local area network.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software, protocols, and data as described below and in the drawings hereto: Copyright© 2001, Intel Corporation, All Rights Reserved.

BACKGROUND

The use of the Internet to support voice traffic is an emerging technology that offers several advantages over the traditional dedicated circuit-switched connections of the public switched telephone network (PSTN). The delivery of voice data over the Internet using the Internet Protocol's (IP) packet-switched connections is referred to as VoIP. One of the advantages of using VoIP is that it bypasses PSTN toll services by using the Internet backbone for long distance transport. In addition, Internet service providers (ISPs) are exempt from access fees to use local telephone company facilities to complete the call. Since PSTN tolls and access fees are a large part of the cost of all long distance calls, the ability to avoid them is a tremendous advantage.

VoIP offers other advantages over PSTN as well, including bandwidth consolidation and speech compression, both of which contribute to overall network efficiency. However, before these advantages are fully realized, certain technical challenges must be met.

In VoIP, voice data travel as packets of digitized data on shared lines. More than other types of data, it is particularly important that voice packets are delivered in a timely way to achieve voice quality that is comparable to PSTN. This can be particularly difficult when using a public network, such as the Internet, where the level of quality of service (QoS) cannot be assured. A number of competing proprietary and non-proprietary standards have been developed to support the transmission of voice packets. Some of the protocols work better for hardware than for software, and vice versa, but none of the protocols have yet solved all of the problems inherent in sending large volumes of voice packets over the Internet.

Figure 1:
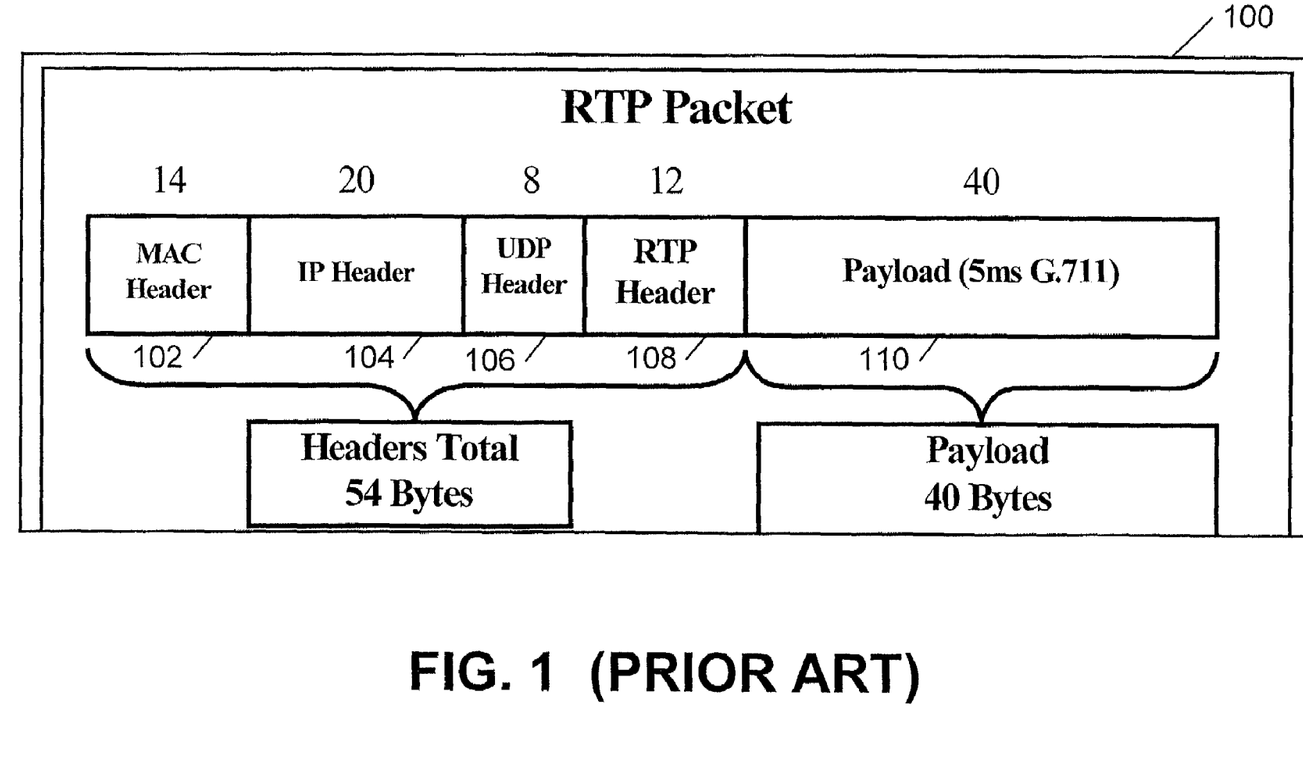
FIG. 1 illustrates a prior art real-time protocol (RTP) packet.

As an example, the real-time protocol (RTP) documented in Request For Comment (RFC) 1889 entitled "RTP: A Transport Protocol for Real-Time Applications," and published in January, 1996, provides end-to-end delivery services for data with real-time characteristics, such as interactive audio and video. FIG. 1 illustrates an example of an RTP packet 100. As illustrated, the RTP packet 100 is comprised of a payload 110 of 40 bytes and four different headers totaling 54 bytes, including a Media Access Control (MAC) header 102, an Internet Protocol (IP) header 104, a User Datagram Protocol (UDP) header 106, and an RTP header 108. The RTP payload 110 is designed to hold voice packets from 5 to 30 milliseconds (ms) in length. Shorter voice packets are considered more desirable, since they result in lower latency and improved voice quality.

Probably the most significant drawback to RTP is the lack of scalability. Because RTP is optimized for sending only a single channel of voice data (i.e. one voice call) per packet long-haul over the Internet, it is necessary to send the packets at a fairly high rate, e.g. 200 packets per second (pps), especially when sending smaller voice packets of 5milliseconds. To support a larger number of voice calls, say 1000, the packet rate increases sharply to 200,000 pps, which quickly degrades the performance of VoIP applications that must process an interrupt every time a packet arrives. Consequently, sending large numbers of packets using RTP tends to degrade the performance of VoIP applications, and makes poor use of bandwidth.

In order to consolidate bandwidth, some protocols aggregate multiple voice channels into a single packet. For example, an aggregated, or multi-channel, version of RTP, developed by the Internet Engineering Task Force (IETF) and documented in an Internet Draft entitled "An RTP Payload Format for User Multiplexing," by J. Rosenberg and H. Schulzrinne, published on May 6, 1998, multiplexes data from multiple users into a single RTP packet in an attempt to reduce packet overhead and improve scalability to ensure that packets get delivered in a timely way. But the aggregated RTP protocol introduces other problems. For example, while the terminating computers have more than enough power to process one voice call, they can quickly become overloaded when simultaneously processing hundreds of voice calls in a single packet, which can again adversely affect the performance of the VoIP applications.

Another drawback to multi-channel RTP and other aggregated channel protocols for VoIP, is the lack of an explicit voice channel ID, which adds additional processing overhead and makes it difficult, if not impossible, to consolidate packet flows. In voice over multi-protocol label switching (VoMPLS), one of the prior art aggregated channel protocols for voice data, the channel identification data is only 8 bits in length and must be combined with the packet identification in order to fully identify the voice channel to which the data belongs. Thus, for example, the channel 5 data on packet flow A is not the same voice channel as the channel 5 data on packet flow B. Consequently, it is not possible to move channels between packets without additional signaling.

Another drawback to current VoIP protocols is that they are not designed to support explicit 8-byte boundary alignment, which is necessary for efficient processing by 64-bit processors.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method for sending multiple voice channels over a packet network using an aggregated voice channel system will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system or electronic commerce application, and their operands, such as transmitting, receiving, retrieving, determining, generating, protocol, data structure, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 2:
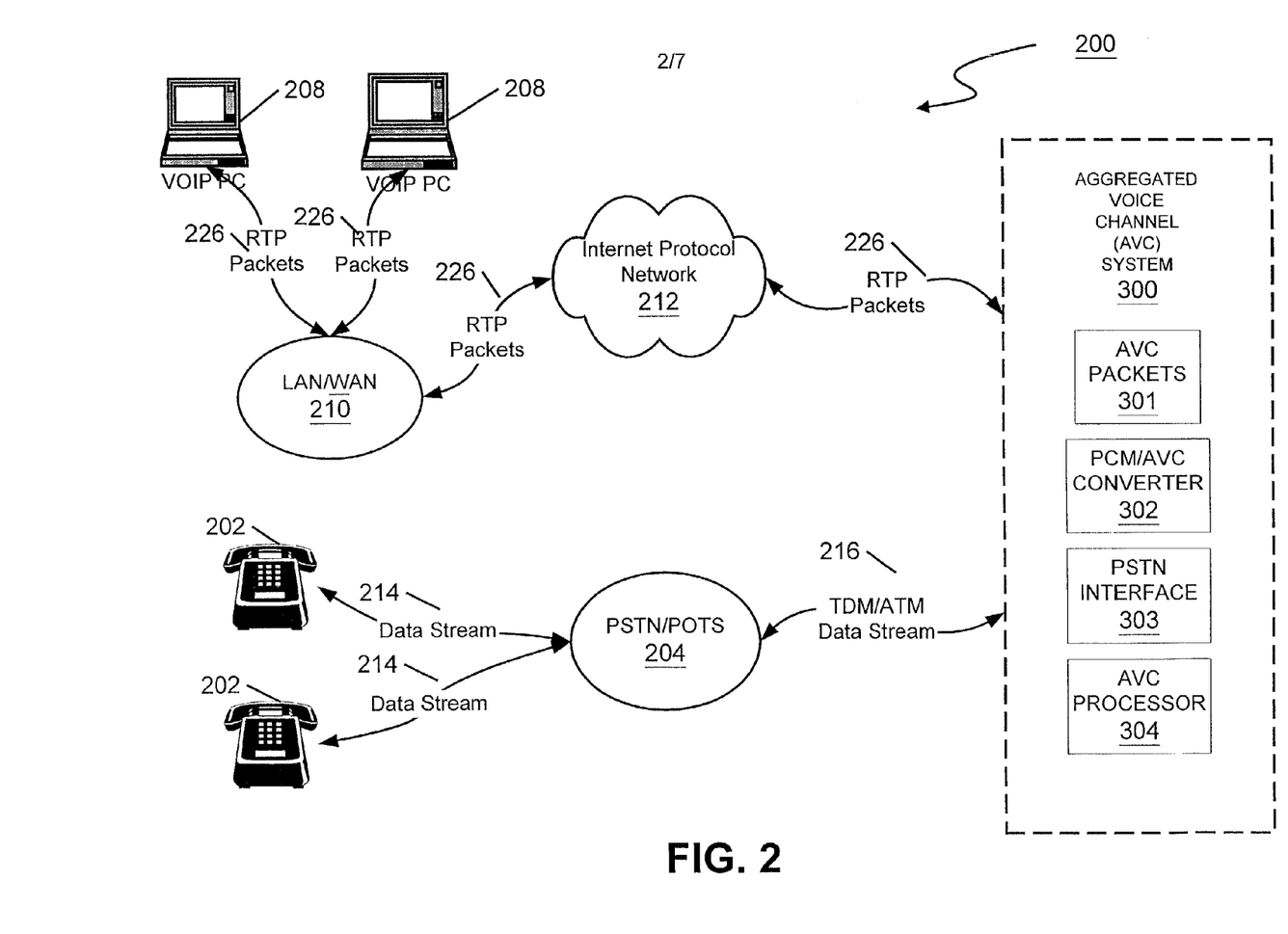
FIG. 2 is a block diagram illustrating one generalized embodiment of an aggregated voice channel (AVC) system incorporating the invention, and the operating environment in which certain aspects of the illustrated invention may be practiced.

FIG. 2 is a block diagram illustrating one generalized embodiment of an aggregated voice channel (AVC) system 300 incorporating the invention, and the operating environment 200 in which certain aspects of the present invention may be practiced. As shown, the AVC system 300 processes voice data received from an Internet Protocol (IP)-based network 212 such as the Internet, or from a traditional Public Switched Telephone Network (PSTN) 204, also referred to as the Plain Old Telephone Service (POTS). When received from an IP network 212, the voice data is typically transmitted in the form of RTP packets 226, although other types of real-time packet protocols may be employed without departing from the scope of the invention. An RTP packet 226 is typically used for one or more voice calls that originate not from a traditional telephone call 202, but rather from a source VoIP-enabled PC 208 that is connected to a LAN/WAN 210 that is connected to the IP packet inter-network 212. The VoIP-enabled PC 208 transmits the voice packet data using an RTP packet 226 or other similar routable packet over the LAN/WAN 210 to the IP packet inter-network 212 for transmission to another VoIP-enabled destination, such as the VoIP ITGs 220 (depicted in FIG. 3, as described below). The voice data carried in an RTP packet 226 is typically compressed, and must be decompressed into pulse code modulation (PCM) or other types of digital schemes for transmitting analog data before being processed by the AVC system 300. The IP network 212 over which the RTP packets 226 are routed can be any packet-based inter-network, including the Internet or a private Internet Telephony Service Provider.

When received from a PSTN/POTS network 204, the voice data is typically transmitted in the form of a multiplexed data stream 216. For example, in the illustrated operating environment 200, the PSTN 204 receives a data stream 214 that may be comprised of analog voice signals that have been digitized using PCM or other types of digital schemes for transmitting analog data. In a T-1 system, for example, the data stream 214 may comprise 8-bit words that represent voice signals that are sampled 8,000 times a second (8 kHz), where each sample is digitized into an 8-bit word. The data stream 214 may contain data that represents not only a regular voice call 202, but also a facsimile transmission device, data modem, or any other device capable of generating data that can be transmitted over a POTS or PSTN voice telephone network. The PSTN 204 typically receives multiple data streams 214 each representing a different voice channel (i.e. an individual voice call), and multiplexes the data together for output to a single multiplexed data stream 216 using a scheme such as the Time Division Multiplex (TDM), or Asynchronous Transfer Mode (ATM) multiplexing technology, although other types of multiplexing may be employed without departing from the scope of the invention.

In one embodiment, the AVC system 300 is comprised of various components, including an AVC packet format 301, a PCM/AVC converter 302, a PSTN interface 303, and an AVC processor 304. The AVC system 300 processes voice data that is being transmitted within the operating environment 200 in an efficient manner that avoids unnecessary overhead. For example, the AVC packet format 301 is optimized to transmit voice data over short-haul local area networks, such as an Ethernet-based network or an "Infini-Band®" system network. The PCM/AVC converter 302 converts PCM data to the AVC data format 301 and vice versa. As an example, the PSTN interface 303 receives the multiplexed data stream 216 from the PSTN 204 and, using the PCM/AVC converter 302, converts the PCM digital voice data into corresponding AVC packets 301. The PCM/AVC converter 302 is also used to convert PCM data derived from an RTP packet 26 into corresponding AVC packets 301. The AVC processor 304 processes the AVC packets 301 in preparation for further processing by a VoIP-enabled application.

It will be apparent to those of ordinary skill in the art that the PCM/AVC converter 302 may convert voice data into AVC packets 301, or vice versa, where the voice data has been digitized using other types of digital schemes for transmitting analog data, and not just data that has been digitized using the PCM scheme. Hence the PCM/AVC converter 302 is so named for convenience and not as a limitation.

Figure 3:
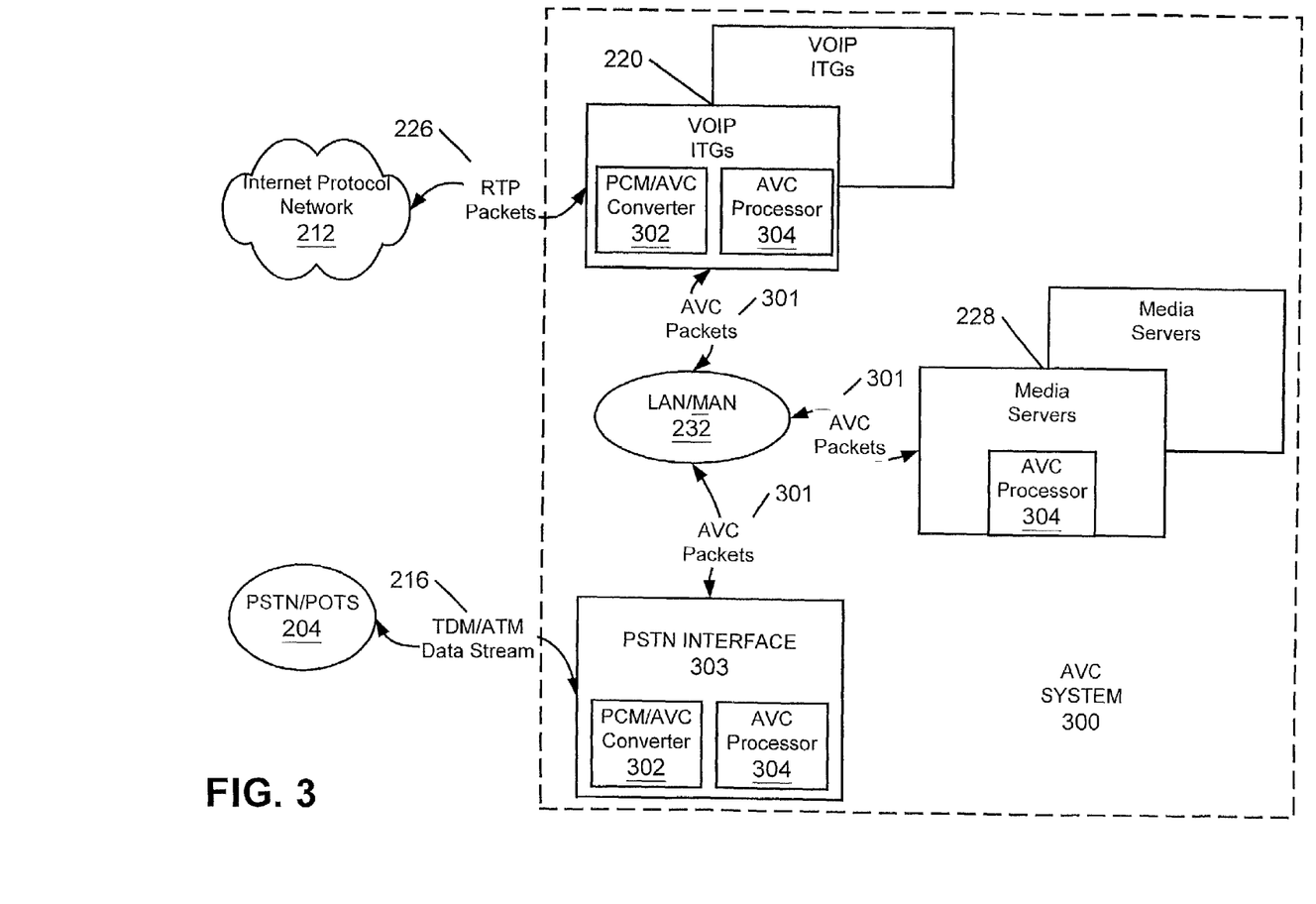
FIG. 3 is a block diagram illustrating the AVC system of FIG. 2 in further detail, in accordance with one embodiment.

FIG. 3 is a block diagram illustrating in further detail the AVC system 300 of FIG. 2 in accordance with an embodiment of the present invention. As shown, the AVC system 300 is comprised of one or more VoIP Internet Telephone Gateways (ITGs) 220, Media Servers 228, and PSTN interfaces 303, that are connected together in a local area network (LAN) or metropolitan area network (MAN) 232 that may be any type of packet-based local area network, such as an Ethernet-based network or an "InfiniBand®" system network. The VoIP ITGs 220 operate to send or receive voice data to or from an IP network 212 via a long-haul packet such as an RTP packet 226 formatted in accordance with the RTP protocol, or other suitable long-haul protocol. Similarly, the PSTN Interface 303 operates to send or receive voice data to or from an PSTN network 204 via a TDM/ATM data stream 216 formatted in accordance with the TDM/ATM protocol, or other suitable telephone network-based protocol. The media servers 228 receive via LAN/MAN 232 AVC packets 301 that were generated by the VoIP ITGs 200, or the PSTN Interface 303, depending on where the voice data originated.

Among other differences, the AVC packet 301 of the present invention does not include layer-3 headers. Layer-3 headers are used to make the packet capable of being routed over long distances, such as via a Local Area Network (LAN) or Wide Area Network (WAN) 210 to an Internet Protocol (IP) inter-network 212. For example, the RTP packet 226 includes layer-3 headers, so that it can be routed via LAN/WAN 210 and IP network 212. In contrast, the AVC packet 301 in the illustrated embodiment is designed to transport voice call traffic over relatively short distances to destinations that may often reside in the same building where the AVC packet 301 originated. For example, as shown in the illustrated embodiment, the AVC packet 301 may originate from an PSTN interface 303 to a PSTN 204, where the PSTN interface 303 is connected to the destination VoIP ITGs 220 or media servers 228 via a LAN or a Metropolitan Area Network (MAN) 232. Since the AVC packets 301 are transmitted over a LAN/MAN 232, they are not subject to being dropped or transmitted out of sequence. Therefore, it is not necessary to process the sequence numbers or time stamps that are a part of layer-3 packet processing. By taking advantage of this aspect of network processing, the design of the AVC packet 301 improves the processing performance of the packets at their respective destinations, e.g. the VoIP-ITGs 220, the Media Servers 228, and the PSTN Interfaces 303, by eliminating the layer-3 header processing (albeit making the AVC packet 301 incapable of being routed over long distances).

Thus, while the VoIP ITGs 220 could simply forward the RTP packet 226 over the LAN/MAN 232 to its destination node, and PSTN interfaces 303 could simply generate RTP packets when receiving voice data in the TDM/ATM data stream 216, it is more efficient, scalable, and robust to use the AVC system 300 to instead generate AVC packets 301 to carry the voice data for this portion of the voice call's journey.

In one embodiment, each VoIP ITG 200 is further provided with a PCM/AVC converter 302 and an AVC processor 304, so that voice data may be converted from PCM format to AVC format 301 and processed before being sent over LAN/MAN 232, and, conversely, processed and converted from AVC to PCM format before being sent over IP network 212 in an RTP packet 226. Similarly, each PSTN interface 303 is further provided with a PCM/AVC converter 302 and an AVC processor 304, so that voice data may be converted from PCM format to AVC format 301 and processed before being sent over LAN/MAN 232, and, conversely, processed and converted from AVC 301 to PCM format before being sent over PSTN network 204 in a TDM/ATM data stream 216. The media servers 228 are provided with an AVC processor 304 so that the AVC packets 301 may be efficiently processed in separate voice channel data for further processing by a variety of computer telephony services hosted on the media servers 228 such as speech recognition applications, or the like, for which the quality (i.e. the transmission and processing speed) of the voice channel data transmitted in the AVC packet 301 is essential.

In one embodiment, upon receiving the data samples in the multiplexed data stream 216 for a given voice channel, the PCM/AVC converter 302 of PSTN interface 303 determines their proper destination based on a unique voice channel identification associated with each sample. Using a control protocol, the PCM/AVC converter 302 of PSTN interface 303 sets up a unique destination-based Segment ID that explicitly identifies the proper destination channel number for each unique voice channel it encounters in the data stream 216. The Segment ID determines to which of the destinations the AVC packet 301 is delivered, e.g. to which of the destination VoIP ITGs 220 or media servers 228.

In one embodiment, the PCM/AVC converter 302 of PSTN interface 303 combines data samples for a given voice channel from the multiplexed data stream 216 into a data segment. Each data segment represents a portion of the voice call (or fax or modem transmission) from which the data originated, where the portion is an optimal length for achieving a low latency. Latency is the elapsed time measured from when the data segment was generated by the source (e.g. the originating telephone 202) to when the data segment is received at the destination (e.g. the VoIP ITG 220). In general, the smaller the portion of the voice call that is represented by the data segment, the lower the latency. In one embodiment, an optimal length is one millisecond (ms), however other lengths may be employed without departing from the scope of the invention. In one embodiment, the data segment comprises eight data samples where each data sample is an 8-bit word, resulting in a data segment of 8 bytes in length, suitable for aggregating in an AVC packet 301 so that the data segments can be aligned on 8-byte boundaries. The data segment may comprise other numbers and sizes of data samples, as long as the resulting data segment is of a length that is suitable for aggregating in an AVC packet 301 so that the data segments can be aligned on 8-byte boundaries. The ability to explicitly align the data segments on 8-byte boundaries enables the AVC system 300 to operate efficiently using 64-bit processors.

The PCM/AVC converter 302 of PSTN interface 303 further aggregates up to four of the data segments and corresponding segment IDs into a quad segment. The PCM/AVC converter 302 generates an AVC packet 301 from one or more of the quad segments, which are pre-pended with the necessary headers for transmission over the LAN/MAN 232 to a destination node such as one of the VoIP-enabled ITGs 220 or a Media Servers 228. Upon receipt by the destination VoIP-enabled ITGs 220 or a Media Servers 228, the corresponding destination AVC processor 304 processes the AVC packet 301 to extract the voice data (i.e. the data segments), according to the proper voice channel (i.e. the segment ID) for further processing by the VoIP-enabled ITGs 220 or media servers 228. For example, when an AVC processor 304 on VoIP-enabled ITGs 220 determines that an AVC packet 301 contains voice data that must be sent to a remote destination over an IP network 212, the PCM/AVC converter 302 on the VoIP-enabled ITG 220 converts the voice data into PCM data that can then be further processed into RTP packets 226 for routing over the IP network 212 to the ultimate destination. When an AVC processor 304 on one of the media servers 228 determines that an AVC packet 301 contains voice data belonging to a voice channel that the media server 228 is processing, the AVC processor 304 parses out the voice data in accordance with the voice channel (i.e. the segment ID) and sends it to the appropriate application(s) (e.g. speech recognition, or other computer telephony service) on the media server 228.

In one embodiment, upon receiving the voice data in the RTP packets 226 from the IP network 212, the PCM/ACM converter 302 of the VoIP ITG 220 converts the PCM data derived from the RTP packets 226 into AVC packets 301 by combining the PCM data into data segments and quad segments in a manner similar to that described above for converting PCM data into AVC packets 301 when the voice data originates from an PSTN network 204. Instead of extracting the PCM voice data from a multiplexed data stream, the PCM voice data and associated voice channels are derived from the packetized voice data transported in the RTP packet 226. Of course, it will be appreciated by those of ordinary skill in the art, that voice data that has been digitized using a scheme other than PCM may be derived from the packetized voice data without departing from the scope of the invention. It is further appreciated by those of ordinary skill in the art that packets other than RTP packets may be the source of the packetized voice data with departing from the scope of the invention.

Figure 4:
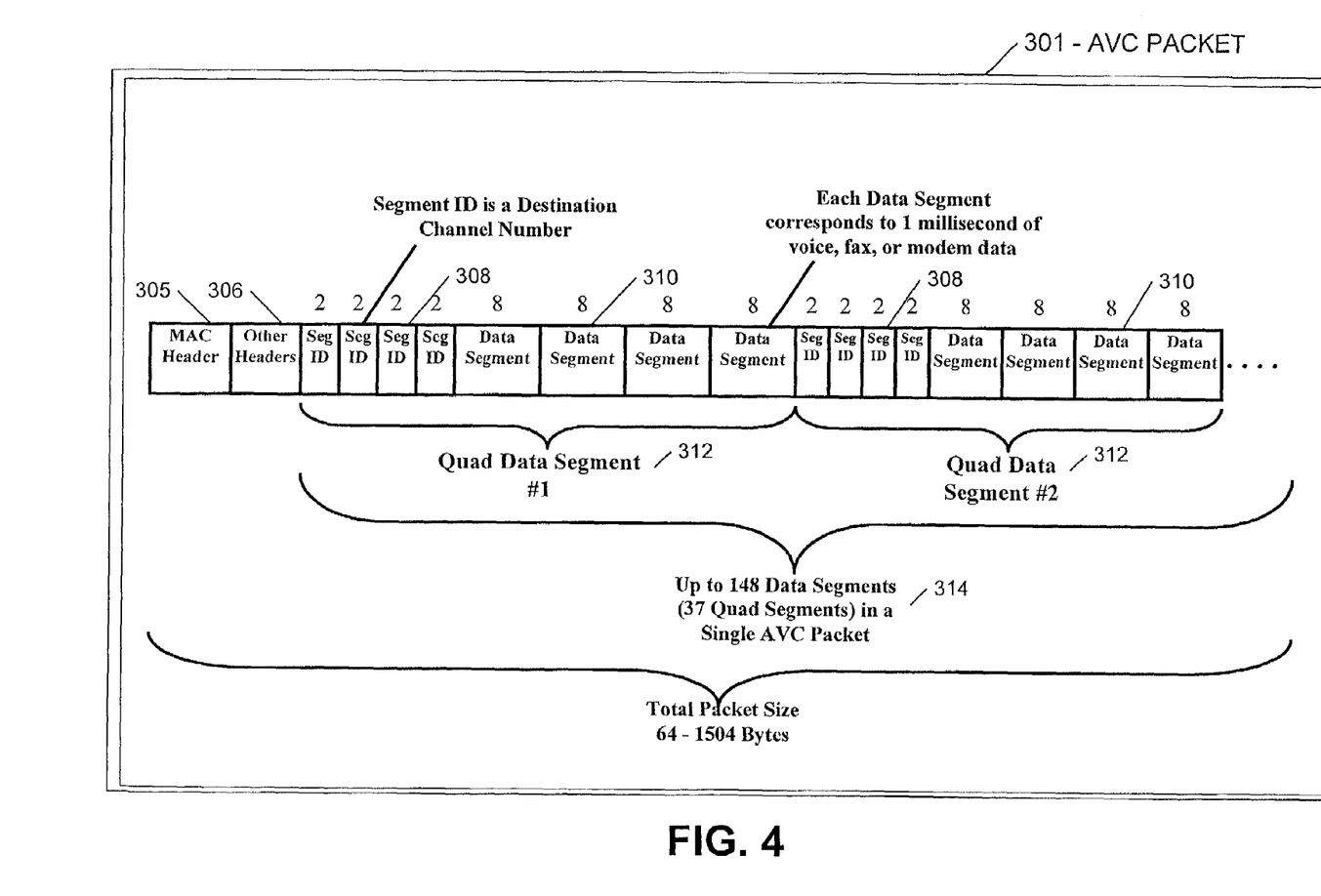
FIG. 4 illustrates a packet format of an aggregated voice channel system of FIG. 2 in accordance with one embodiment.

FIG. 4 illustrates a packet format of an AVC packet 301 in accordance with one embodiment of the AVC system 300 of FIG. 2. Unlike the prior art packet formats of RTP protocols, an example of which is illustrated in FIG. 1, the packet format of an AVC packet 301 is layered on a LAN protocol rather than on top of an IP protocol. The IP headers are unnecessary since, as previously explained, the AVC packet 301 need only be transmitted over short distances, such as within a building across an "InfiniBand®" system network, or across a campus over an Ethernet-based network, such as the LAN/MAN 232. This reduces the header overhead, leaving only the MAC header 305, and other headers 306 necessary for proper delivery of the AVC packet 301 in accordance with a LAN protocol.

In one embodiment, after the headers, the next 40 bytes of the AVC packet 301 comprise one or more quad segments 312 that each contain up to four segment IDs 308, followed by their respective data segments 310. The data segments 310 comprise the digitized voice data obtained from the TDM/ATM data stream 216 or from the RTP packets 226. The segment IDs 308 represent an identification of the voice channel associated with the digitized voice data in the data segments 310. For example, the segment ID 308 may represent the voice channel associated with the PCM data samples of a given voice channel transmitted in the multiplexed data stream 216 by the PSTN 204 (or, in the case of packetized voice data originating from an RTP packet, the PCM data samples of a given voice channel transmitted in the RTP packets 226 by IP network 212). This quad arrangement of segment IDs 308 and data segments 310 allows the AVC packet data 301 to be aligned along 8-byte boundaries to facilitate efficient processing by a terminating computing device, such as the VoIP-enabled ITG 220, or media server 228 illustrated in FIG. 3.

In one embodiment, the segment IDs 308 are each 2 bytes in length, capable of storing 16 bits of data, which is sufficient to explicitly define a unique destination number for the voice channel or other unique identification associated with the destination of the voice channel. Explicit destination voice channel identification provides a performance advantage since it eliminates the need to derive or lookup the voice channel based on the data segment's 310 position within the transmission packet (i.e. the AVC packet 301), the transmission packet identification (i.e. the packet headers), or other data contained in or external to the transmission packet (i.e. in the control protocol packets or other out-of-band communication), as is required with prior art methods.

In one embodiment, explicit destination voice channel identification further allows for packet consolidation as the number of voice channels that are in use fluctuates over time. For example, the VOIP system operating environment 200 might process one thousand telephone calls that require the generation of ten different packet flows 301 of one hundred voice channels each. Should half of the calls terminate, leaving only five hundred active calls in the VoIP system operating environment 200, then using explicit voice channel identification, the remaining five hundred voice channels can be dynamically consolidated into only five packets or packet flows 301 of one hundred voice channels each.

The ability to dynamically consolidate packets is a significant advantage, as the amount of voice traffic in the VoIP system operating environment 200 may fluctuate widely at any given minute or hour. By responding dynamically to accommodate the different operating conditions, the AVC system 300 can make more efficient use of the available bandwidth on LAN/MAN 232. In contrast, prior art methods of transporting voice data, such as the RTP packets 226, or the VoMPLS packets (not shown) rely on an implied voice channel identification, and cannot respond as quickly to changing operating conditions. For example, in the RTP packet 100 illustrated in FIG. 1, the voice channel identification of the voice call carried in the payload 110 must be derived from the UDP Port number specified in the UDP header 106, as each unique voice channel was previously assigned to a specific UDP Port number using a separate out-of-band control packet. When the call terminates, the UDP Port number must be reassigned to a new call using the out-of-band communication. The AVC packet 301, on the other hand, does not use out-of-band communication to determine which voice channel is associated with a particular data segment 310. Rather, the voice channel identification is already specified explicitly in the AVC packet's 301 segment ID 308. In other words, using the AVC packet 301, the voice channel associated with the voice data contained therein is self-identified.

In one embodiment, the AVC/PCM converter 302 generates data segments 310 that comprise eight samples of PCM voice data sampled at an 8 KHz rate. Each PCM sample is one byte in length, so that eight PCM samples combine to form an 8-byte word that represents one millisecond of voice data from the PSTN 204. Other size data samples may be employed without departing from the principles of the invention, as long as the resulting data segment 310 can be aligned along an 8-byte boundary when aggregated into the quad segment 312. Smaller samples are generally more beneficial as they result in lower latency, which improves the performance of computer telephony applications at the terminating computers, such as speech recognition applications and the like.

In one embodiment, the quad data segment 312 is the minimum unit of voice data transfer in an AVC system 300. Since not all data segments may be needed for a given AVC packet flow, the AVC/PCM converter 302 generates inactive data segments 310 by marking them with a special segment ID 308, such as 0xFFFF. In one embodiment, the AVC/PCM converter 302 may aggregate up to one hundred and forty-eight data segments 310, or thirty-seven quad data segments 312, together in a single AVC packet 301 of up to 1480 bytes, well within the current maximum allowable length of 1504 bytes for Ethernet-based networks. For Ethernet networks that support jumbo packet lengths or other unconventional packet lengths (e.g. the shorter packet sizes of an "InfiniBand®" system network), then the AVC packet 301 may comprise greater or fewer numbers of data segments 310 and quad segments 312 as necessary without departing from the scope of the invention.

Figure 6:
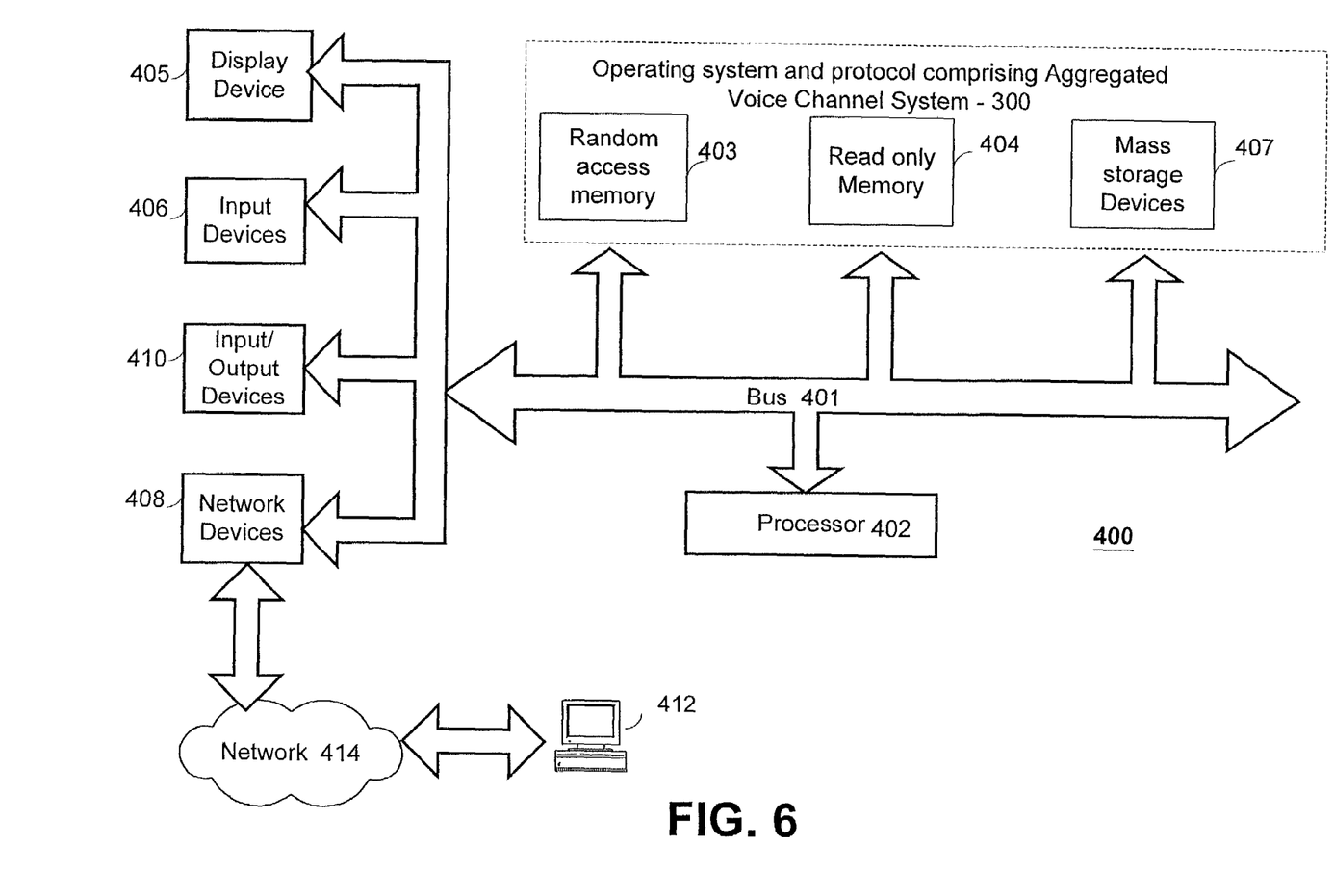
FIG. 6 illustrates an overview of a suitable computing environment in which certain aspects of the illustrated invention shown in FIGS. 2, 3, 4, and 5 may be practiced.

Turning now to FIG. 6, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-accessible media). The computer-executable instructions may be written in a computer programming language or may be embodied in firmware logic, or in micro-engine code, or the like. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 5:
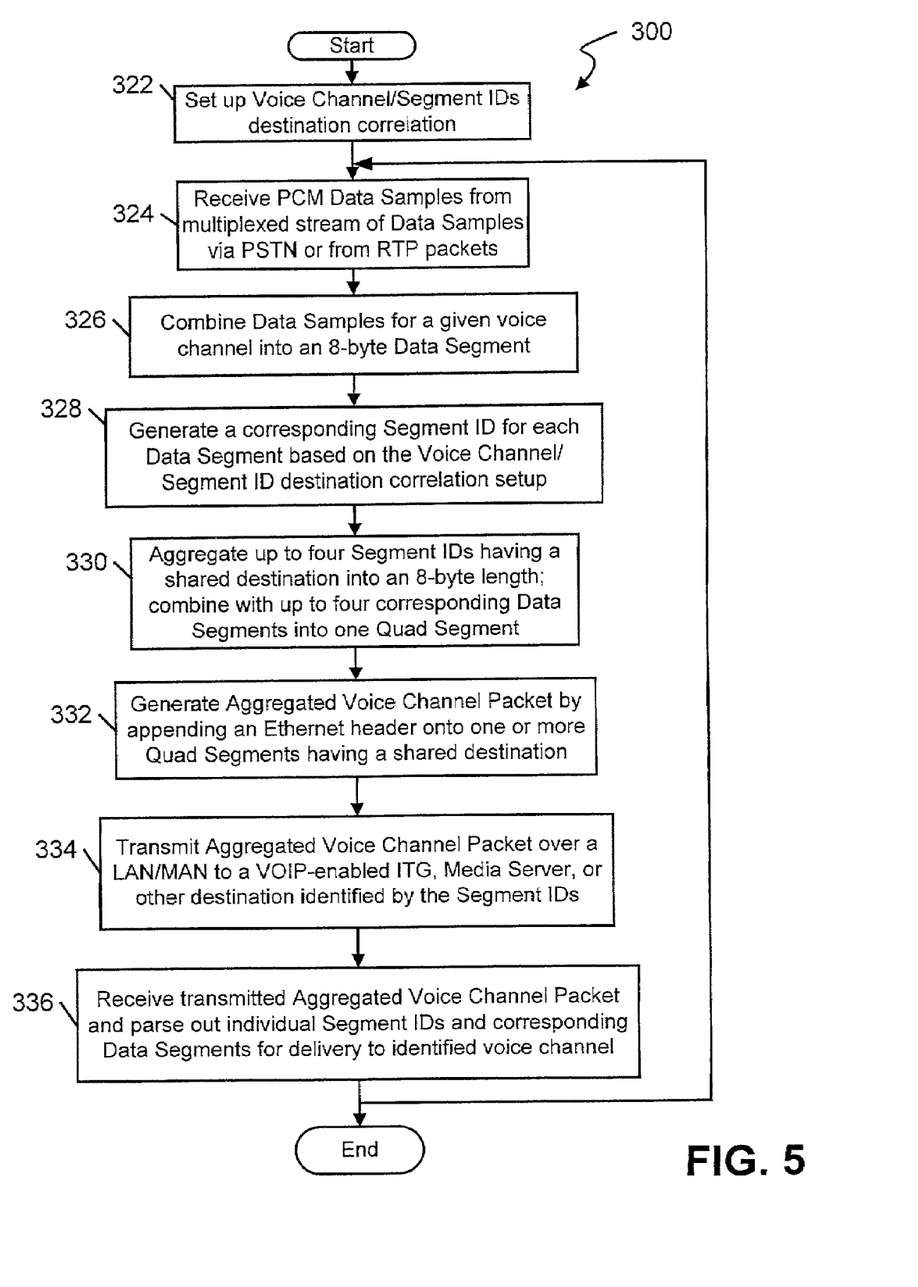
FIG. 5 is a flow diagram illustrating certain aspects of a method to be performed by a computing device executing one embodiment of the illustrated invention shown in FIGS. 2–3.

FIG. 5 illustrates certain aspects of the AVC system 300 to send multiple voice channels over packet networks. In particular, FIG. 5 illustrates some of the acts to be performed by a computer executing an AVC system 300 that incorporates one embodiment of the invention.

In one embodiment, at processing block 322, the AVC system 300 sets up a correlation between the destination voice channels that are encountered in the multiplexed data stream 216 from PSTN network 204 or in the RTP packets 226 from IP network 212, and the possible values of segment IDs used to designate those destination voice channels. In one embodiment, the AVC system 300 sets up the correlation using a control protocol packet or other out-of-band communication prior to processing the voice channel data. Processing the voice channel data commences at processing block 324, where the AVC/PCM converter 302 receives a digitized voice data from the multiplexed data stream 216 representing a portion of a voice call 202, or derived from the RTP packets 226 via the IP network 212. In one embodiment, the multiplexed data stream 216 comprises multiple samples of PCM voice data sampled at an 8 KHz rate. In one embodiment, the RTP packets 226 contain packetized voice data from which is derived multiple samples of PCM voice data sampled at an 8 KHz rate. At processing block 326, the AVC/PCM converter 302 combines the multiple samples of PCM voice data into an 8-byte data segment 310. At processing block 328, the AVC/PCM converter 302 generates a corresponding segment ID 308 for each of the data segments 310, where the segment ID 308 explicitly identifies the destination voice channel number with which the voice call 202 is associated, the segment ID 308 having been determined from the voice channel/segment ID destination correlation set up process previously performed at processing block 322. At processing block 330, the AVC/PCM converter 302 aggregates up to four segment IDs 308 having a shared destination node into an 8-byte segment, and further aggregates the corresponding data segments 310 into a single quad segment 312. If there are less than four segment IDs 308 and corresponding data segments 310 to aggregate, then the quad segment 312 is generated with inactive segment IDs such that the segment IDs 308 and data segments 310 of the quad segment 312 are still capable of explicit alignment on 8-byte boundaries. Processing continues at processing block 332, where the AVC/PCM converter 302 generates the AVC packet 302 by pre-pending an Ethernet header (or "InfiniBand®" header, or the like) onto one or more of the quad segments 312.

In one embodiment, at processing block 334, the AVC processor 304 transmits the AVC packet 301 over a packet-based network 232, to a destination node computing device, such as a VoIP-enabled ITG 220 or a Media Server 228 or other device that hosts a speech recognition application or other computer telephony service. At processing block 336, the AVC processor 304 receives the transmitted AVC packet 301, and parses out the voice data into the appropriate voice channels in accordance with the segment IDs 308 and data segments 310, where, depending on the voice channel and call destination, the voice data is passed to the speech-recognition application or other computer-telephony service for further processing.

FIG. 6 illustrates one embodiment of an apparatus that may be used as a means for generating, transmitting or receiving, and processing AVC packets 301 containing multiple voice channels over a packet network. Although the embodiment described uses a personal computer (PC), other devices including network servers, network processors, or other network accessible devices may also be used. One embodiment of the present invention may be implemented on a PC architecture. However, it will be apparent to those of ordinary skill in the art that alternative computer system architectures or other processor, programmable or electronic-based devices may also be employed.

In general, such computer systems as illustrated by FIG. 6 include a processor 402 coupled through a bus 401 to a random access memory (RAM) 403, a read only memory (ROM) 404, and a mass storage device 407. Mass storage device 407 represents a persistent data storage device, such as a floppy disk drive, fixed disk drive (e.g., magnetic, optical, magneto-optical, or the like), or streaming tape drive. Processor 402 may comprise one or more of any of a wide variety of general purpose processors or microprocessors (such as the Pentium® processor manufactured by Intel® Corporation), a special purpose processor, or a specifically programmed logic device, any of which may be based on a 32-bit, 64-bit, or other processor architecture.

Display device 405 is coupled to processor 402 through bus 401 and provides graphical output for computer system 400. Input devices 406 such as a keyboard or mouse are coupled to bus 401 for communicating information and command selections to processor 402. Also coupled to processor 402 through bus 401 is an input/output interface 410 which can be used to control and transfer data to electronic devices (printers, other computers, etc.) connected to computer system 400. Computer system 400 includes network devices 408 for connecting computer system 400 to a network 414 through which the AVC packets 301 may be transmitted and received, e.g., from remote device 412. Network devices 408, may include Ethernet devices, phone jacks and satellite links. It will be apparent to one of ordinary skill in the art that other network devices may also be utilized.

One embodiment of the invention may be stored entirely as a software product on mass storage 407. It is also to be appreciated that the series of instructions comprising the software product need not be stored locally, and could be stored on a propagated data signal received from a remote storage device, such as a server on a network, via a network/communication interface. The instructions are copied from the storage device, such as mass storage 407, or from the propagated data signal into a memory subsystem 403/404 and then accessed and executed by processor 402. In one implementation, these software routines are written in the C++ programming language. It is to be appreciated, however, that these routines may be implemented in any of a wide variety of programming languages. Another embodiment of the invention may be embedded in a hardware product, for example, in a printed circuit board, in a special purpose processor, or in micro-engine code of a network processor implemented on a specifically programmed logic device communicatively coupled to bus 401. Still other embodiments of the invention may be implemented partially as a software product and partially as a hardware product.

Figure 7:
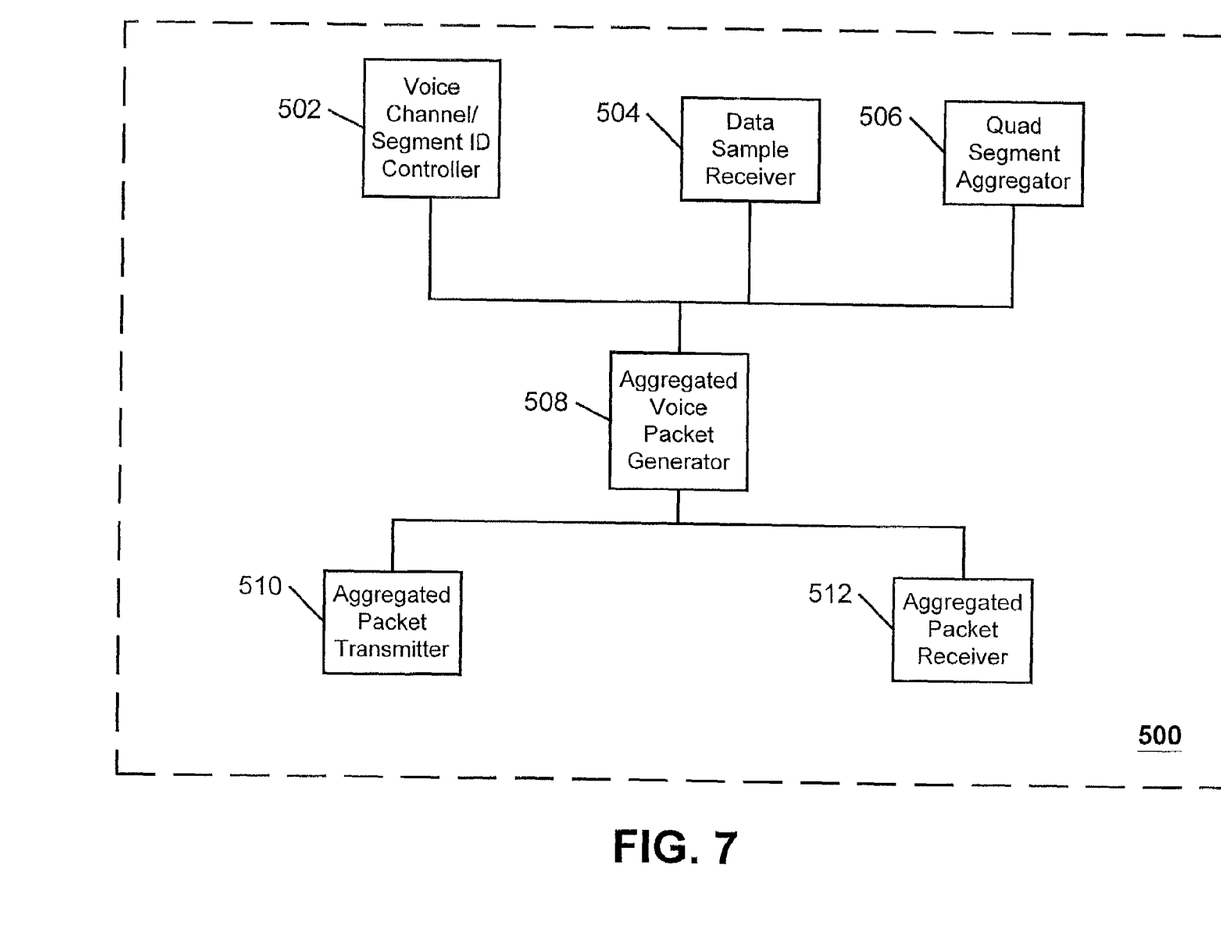
FIG. 7 is a block diagram illustrating one generalized embodiment of an aggregated voice channel system incorporating the invention, and the computer-readable medium in which certain aspects of the illustrated invention shown in FIGS. 2, 3, 4, 5 and 6 may be practiced.

Embodiments of the invention may be represented as a software product stored on a machine-accessible medium (also referred to as a computer-accessible medium, computer-readable medium, processor-accessible medium, or processor-readable medium) 500 as illustrated in FIG. 7. The machine-accessible medium 500 may be any type of magnetic, optical, or electrical storage medium including a diskette, CD-ROM, memory device (volatile or non-volatile), or similar storage mechanism. The machine-accessible medium 500 may contain various sets of instructions, code sequences, configuration information, or other data. It should be further noted that the machine-accessible medium 500 may even include a communications medium over which a propagated data signal containing the various sets of instructions, code sequences, configuration information, or other data, may be transported into a memory subsystem 403/404 and then accessed and executed by processor 402 without departing from the scope of the invention. Those of ordinary skill in the art will further appreciate that other instructions and operations necessary to implement the described invention may also be stored on the machine-accessible medium 500.

FIG. 7 illustrates a generalized embodiment of a machine-accessible medium 500 that includes instructions that when executed by a machine causes the machine to perform operations comprising sending multiple voice channels over a packet network in accordance with the method and apparatus of the present invention. The instructions include, among others, voice channel/segment ID controller instructions 502, data receiver 504 instructions, quad segment aggregator instructions 506, AVC packet generator instructions 508, and AVC packet transmitter 510 and receiver 512 instructions.

By way of comparison, in an end-to-end connection in a VOIP system operating environment 200 illustrated in FIGS. 2 and 3 that processes fifty voice channels of multiplexed voice data, an embodiment of the AVC system 300 of the present invention requires only one-tenth of the packets per second, one-fifth of the latency, and only one-half of the bandwidth required as would be required to send the same amount of multiplexed voice data by the multi-channel RTP protocol, as summarized in Table 1, below:

TABLE 1

| Packet Type | Packet Time Unit | Packets Per Second Per Channel | Packets Required for 50 Channels | Total Packets Per Second |
|---|---|---|---|---|
| Multi-Channel RTP | 5 ms | 200 | 50 | 10,000 |
| Aggregated Voice Packet Protocol 300 | 1 ms | 1000 | 1 | 1000 |

Accordingly, a novel method is described for sending multiple voice channels over a packet network using an AVC system 300. From the foregoing description, those skilled in the art will recognize that many other variations of the present invention are possible. Thus, the present invention is not limited by the details described. Instead, the present invention can be practiced with modifications and alterations within the spirit and scope of the appended claims.

What is claimed is:

1. A method comprising:
    assigning a plurality of segment IDs to a plurality of channels associated with a plurality of digitized segments of data;
    determining a boundary number that represents a number of segment IDs to be aggregated into a first section and a number of corresponding digitized segments of data to be aggregated into a second section;
    aggregating the determined boundary number of segment IDs into the first section, wherein the segment IDs share a destination node, wherein aggregating comprises, if the number of segment IDs that share the destination node is less than the boundary number of segment IDs, adding an inactive segment ID so the number of segment IDs is equal to the boundary number of segment IDs;
    aggregating the determined boundary number of digitized segments of data into the second section, wherein each aggregated digitized segment of data in the second section is associated with a segment ID in the first section, wherein aggregating comprises, if an inactive segment ID is added, adding an associated inactive data segment;
    combining the first section and the second section into a packet segment;
    appending a network header to the packet segment to create a multi-channel packet; and
    transmitting the multi-channel packet over a network.

2. The method of claim 1, wherein the boundary number is four.

3. The method of claim 2, wherein the LAN is an Ethernet, and the LAN header is a media access control (MAC) header.

4. The method of claim 1, where one or more of the channels are voice channels, and one or more of the digitized segments of data represent voice data.

5. The method of claim 4, wherein one or more of the digitized segments of voice data include at least one sample of pulse-code modulated (PCM) voice data.

6. The method of claim 1, wherein one or more of the digitized segments of data are obtained from a payload of an input packet.

7. The method of claim 6, wherein the input packet is an Real Time Protocol (RTP) packet.

8. The method of claim 1 wherein the network header includes a local area network (LAN) header and the network includes a local area network (LAN).

9. The method of claim 1, where one or more of the channels are fax channels, and one or more of the digitized segments of data represent fax data.

10. The method of claim 1, wherein one or more of the digitized segments of data are obtained from a time-division multiplexed (TDM) stream of data.

11. The method of claim 1, wherein one or more of the digitized segments of data are obtained from an asynchronous transfer multiplexed (ATM) stream of data.

12. An apparatus for arranging digitized segments of data comprising:
   a data segment receiver to receive a plurality of data segments each having a digitized segment of voice data;
   a voice channel identifier to determine which of a plurality of voice channels is associated with each of the received data segments and to generate an associated segment ID for each data segment;
   a data segment aggregator to aggregate a determined boundary number of segment IDs into a first section and to aggregate the determined boundary number of digitized segments of data into a second section, wherein the aggregator adds an inactive segment ID if the number of segment IDs that share a destination node is less than the determined boundary number of segment IDs so the number of segment IDs is equal to the boundary number of the segment IDs, and adds an inactive data segment if the inactive segment ID is added;
   a multi-channel voice packet generator to combine the first section and the second section into a packet segment and to append a local area network (LAN) header to the packet segment to create a multi-channel voice packet; and
   a packet transmitter to transmit the multi-channel voice packet over a LAN.

13. The apparatus of claim 12, wherein the determined boundary number is four.

14. The apparatus of claim 12, wherein the segment IDs are each 2 bytes in length.

15. A machine accessible tangible storage medium including content that when accessed by a machine causes the machine to perform operations comprising:
   assigning a plurality of segment IDs to a plurality of channels associated with a plurality of digitized segments of data;
   determining a boundary number that represents a number of segment IDs to be aggregated into a first section and a number of corresponding digitized segments of data to be aggregated into a second section;
   aggregating the determined boundary number of segment IDs into the first section, wherein the segment IDs share a destination node, wherein aggregating comprises, if the number of segment IDs that share the destination node is less than the boundary number of segment IDs, adding an inactive segment ID so the number of segment IDs is equal to the boundary number of segment IDs;
   aggregating the determined boundary number of digitized segments of data into the second section, wherein each aggregated digitized segment of data in the second section is associated with a segment ID in the first section, wherein aggregating comprises, if an inactive segment ID is added, adding an associated inactive data segment;
   combining the first section and the second section into a packet segment;
   appending a network header to the packet segment to create a multi-channel packet; and
   transmitting the multi-channel packet over a network.

16. The machine accessible tangible storage medium of claim 15, wherein the boundary number is four.

17. The machine accessible tangible storage medium of claim 15, wherein the network header includes a local area network (LAN) header and the network includes a local area network (LAN).

* * * * *